No. 753,919. PATENTED MAR. 8, 1904.
G. B. ROWE.
SHEARS.
APPLICATION FILED JUNE 1, 1903.
NO MODEL. 2 SHEETS—SHEET 1.
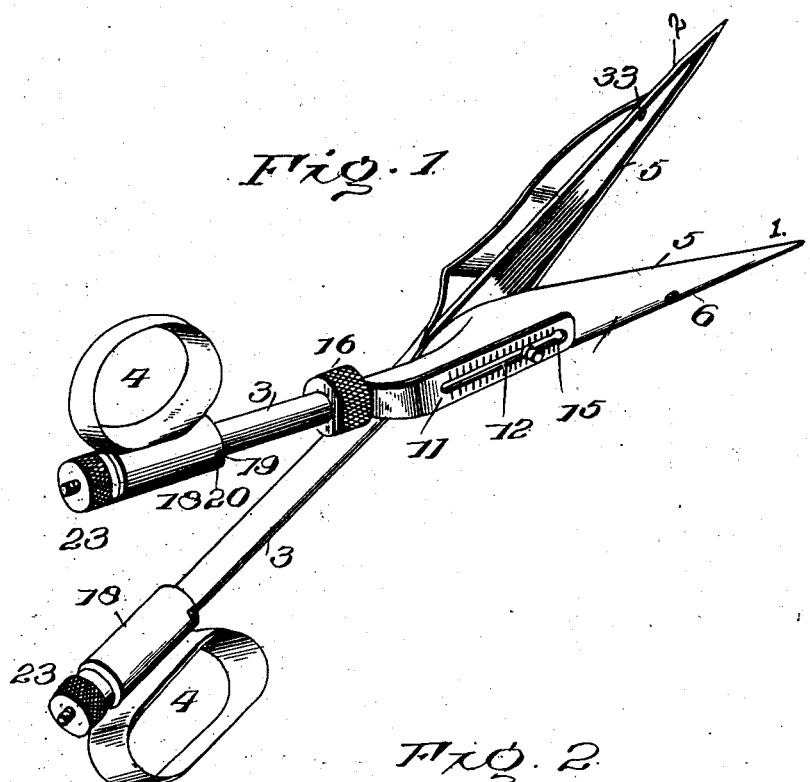
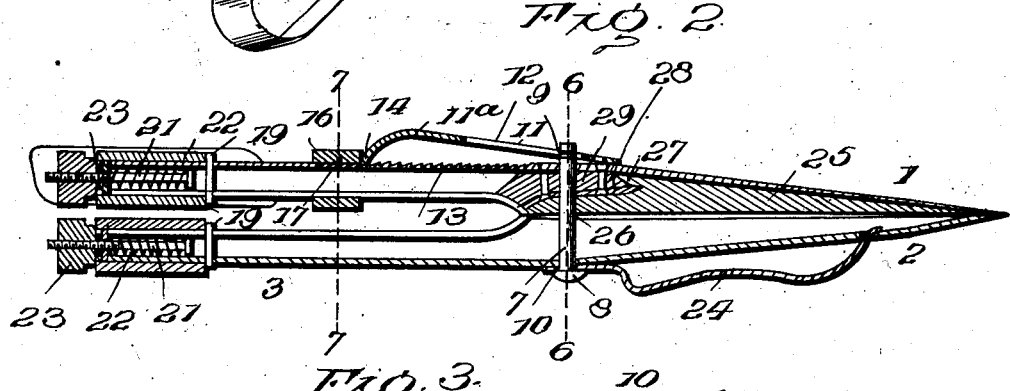
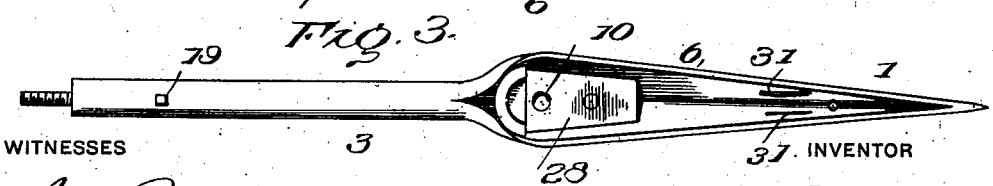
WITNESSES
INVENTOR
G. B. Rowe

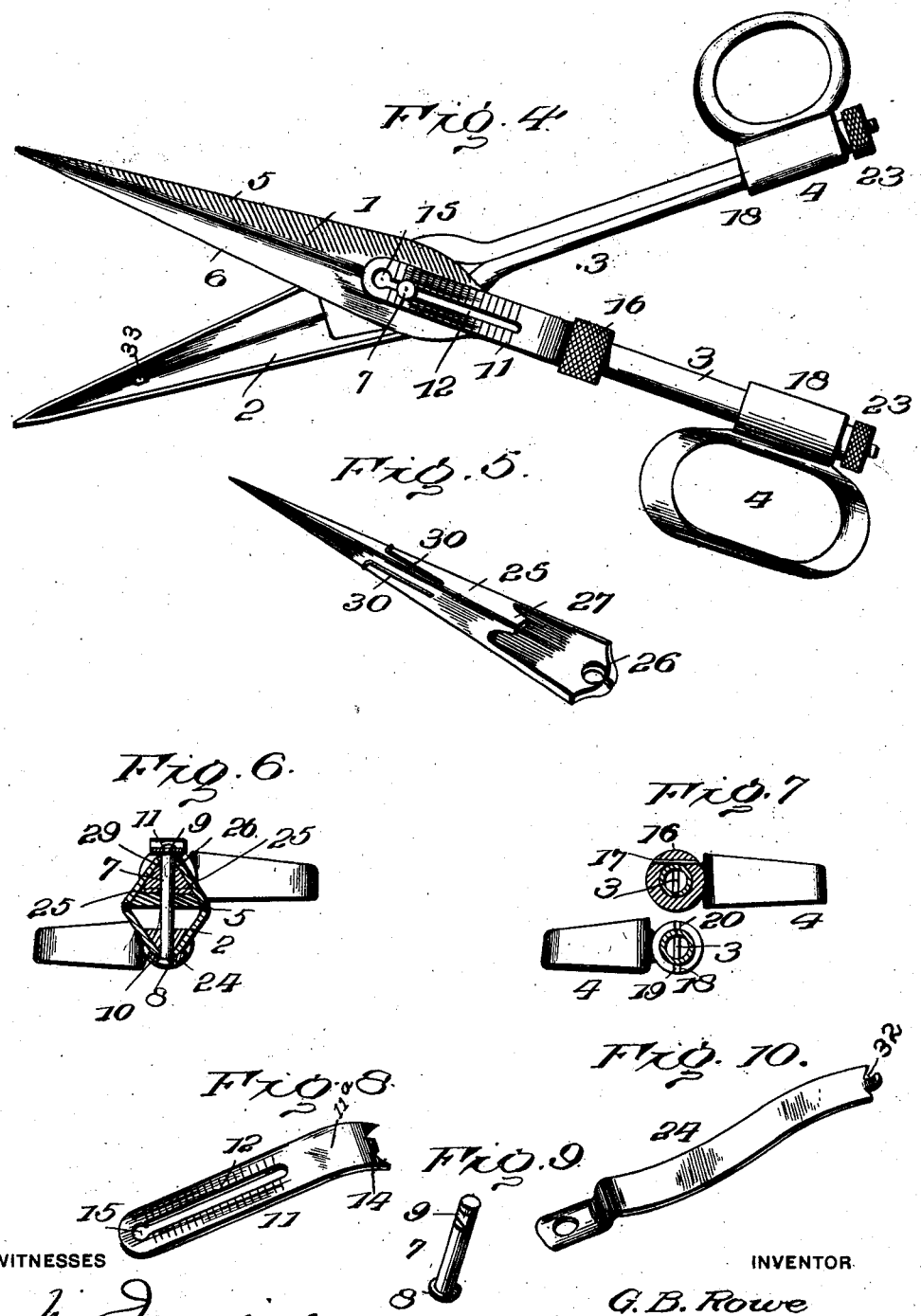

No. 753,919.

Patented March 8, 1904.

UNITED STATES PATENT OFFICE.

GEORGE B. ROWE, OF MOORE, OKLAHOMA TERRITORY.

SHEARS.

SPECIFICATION forming part of Letters Patent No. 753,919, dated March 8, 1904.

Application filed June 1, 1903. Serial No. 159,588. (No model.)

*To all whom it may concern:*

Be it known that I, GEORGE BUCHER ROWE, a citizen of the United States, residing at Moore, in the county of Cleveland and Territory of Oklahoma, have invented certain new and useful Improvements in Shears, of which the following is a specification.

This invention relates to improvements in the type of shears embodying the use of shear-blades having double cutting edges, and aims to provide a simple means for reversing the handles by which the shears are manipulated in order to enable the blades to be reversed when it is desired to use either set of cutting edges. One side of corresponding cutting edges upon the shears are bearded and the other corresponding edges are smooth. The utility of the special form of cutting edges lies in the fact that when the shears are to be used for cutting heavy material, such as coarse fiber, the bearded edges of the cutting-blades may be by adjustment thereof brought into coöperation to perform the heavy work, and when the shears are used for light work, such as cutting cloth materials or the like, the blades may be again reversed to bring the smooth edges thereof into coöperation.

Further, it is the object of my invention to provide novel means for pivotally securing the shear-blades together. Also the shears are constructed and auxiliary means provided whereby the blade may be sharpened by the use of a special form of sharpener attachment, which is adapted to be secured to the shears in such a manner that by operation of the blades the edges of the same may be readily sharpened, obviating the necessity of applying the blades to the common grindstone or other means which are ordinarily used for this purpose.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of the shears constructed in accordance with my invention. Fig. 2 is a vertical longitudinal sectional view through the shears and sharpener. Fig. 3 is a bottom plan view of one of the shear-blades. Fig. 4 is a side elevation of the shears. Fig. 5 is a detail perspective view of the sharpener attachment. Fig. 6 is a transverse sectional view on the line 6 6 of Fig. 2. Fig. 7 is a similar transverse sectional view on the line 7 7 of Fig. 2. Fig. 8 is a detail perspective view of the adjustable plate. Fig. 9 is a detail perspective of the pivot-fastening. Fig. 10 is a detail view of the relatively fixed plate.

Corresponding and like parts are referred to in the following description and indicated in all the views of the drawings by the same reference characters.

The shears consist, essentially, of the blades 1 and 2, which are provided upon the butt-ends 3 thereof with handles 4. The blades 1 and 2 are provided with bearded cutting edges 5 and smooth edges 6. The blades are of concavo-convex form in cross-section, as shown most clearly in Fig. 6 of the drawings, and the butt-ends 3 thereof are tubular in cross-section, being integrally formed with the blades. The blades are secured together by a pivotal fastening 7, which fastening is headed, as shown at 8, at one end and notched upon the opposite sides at the other end, as indicated by the numeral 9. The fastening 7 passes through the openings 10 in the respective blades, and a spring-plate 11, provided in its length with a longitudinal opening 12, is adapted to secure the blades together by coöperation with the pivotal fastening 7. The spring-plate 11 is provided with a curved end portion 11ª, which end portion is also provided with an arcuate notch to coöperate with the butt portion of the blades. Upon the butt portion 3 of one of the blades are disposed a plurality of teeth 13, which teeth are adapted to be engaged by a lug 14, disposed upon the curved end portion of the spring-plate 11 to secure the said plate at an ascertained adjustment. The lug is situated centrally upon the arcuate notched end, as shown most clearly in one of the detail figures. The longitudinal opening 12 upon the spring-plate is enlarged at 15 to receive the end of the pivoted fastening, and the main portion of the opening coöperates with the notches 9 upon the opposite sides of the pivot-fastening to hold the same in position, adjustment of the spring-plate near the points of the blades of course increasing the tension exercised thereby and holding the blades to a greater or less degree in frictional contact with each other. Any looseness of the blades caused by continuous use of the shears may thus be compensated for by the adjustment of the spring-plate 11. To facilitate the adjustment of this plate, a finger element 16 is provided, which element 16 is mounted upon the tubular butt-end 3 of one of the blades, being itself of tubular form, and having upon the inner periphery thereof a spring-actuated pawl 17, which is adapted to engage the teeth 13 and secure the finger-piece in the adjustable position upon the butt-end aforesaid. The finger element 16 is primarily provided to coöperate with the curved end portion of the spring-plate 11, so that the same may be given a longitudinal movement toward the pointed ends of the blades to increase the tension upon the pivot-fastening 7. The finger element may be given a rotatory movement when it is desired to move the same rearwardly, said rotatory movement throwing the pawl out of engagement with the teeth 13 in a manner which will be readily comprehended. The handles 4 are mounted upon the butt-ends 3 of the blades, being provided with tubular journals 18, which journals receive the aforesaid tubular butt-ends of the blades to permit a rotatory movement thereof. Locking means are provided to secure the handles in either of the reverse positions thereof, and said locking means consist of lugs 19, projected from the parts 3 of the blades, which lugs coöperate with the notches 20 upon the journal portions 18 of the handles 4 to hold the handles rigidly in their proper positions. In order to permit of quick adjustment of the handles in either of the reverse positions, a stem 21 is disposed within the tubular butt-ends 3, which stems are adapted for a limited longitudinal movement therein and are normally held in an innermost position by coil-springs 22, disposed therearound. Thumb-nuts 23 are mounted upon the threaded ends of the stems 21, and these nuts 23 abut against the outer portions of the journals 18 of the handles, and through the medium of the springs 22 and stems 21 the said thumb-nuts serve to normally cause engagement of the notches 20 upon the journals 18 with the lugs 19 upon the butt-ends 3. To reverse the handles, it is only necessary to exert a rearward pressure thereupon, so as to disengage the notches 20 from the lugs 19, the springs 22 and stems 21 permitting the movement aforesaid. The handles are then given a rotatory movement, so as to engage the notches which are disposed upon opposite sides of the journals with the lugs 19.

To assist in rigidly holding the blades 1 and 2 in contact with each other, a relatively fixed spring-plate 24 is disposed upon the side of the blade 2, this plate serving to a certain extent to equalize the tension exerted by the spring-plate 11 upon the opposite side of the blade 1 and obviates any binding action which might otherwise be a detriment to the action of the blades.

The sharpener attachment consists of a filling-block 25, which is of a form corresponding to the peculiar form of the blades 1 and 2, being approximately plano-convex in cross-sectional view. The filling-block 25 is adapted to be interchangeably placed within the concave portions of the blades 1 and 2 and to be removably attached to the blades. The block 25 tapers toward one end to conform to the outline of the blade and is provided at this larger end with an opening 26, which opening receives the pivot-fastening 7 when the block is secured in position upon either blade. A lug 27, disposed between the ends of the block 25, engages beneath the plates 28, disposed adjacent the pivot-opening upon the blades. Beneath the plates 28 is located an elastic filler 29, against which the lug 27 upon the sharpener-block 25 bears, and which filler by its elasticity serves to prevent play of the block when same is disposed in position on the blade. To coöperate with the lug 27, spring-pawls 30, disposed adjacent thereto, are provided to engage with recesses 31 upon the concave sides of the blade The block 25 is provided upon its plane side with abrasive material of suitable character, such as corundum or emery, which constitutes the sharpening material and which may be secured to the surface of the block by adhesive means or in any other convenient way. The abrasive surface is therefore made renewable, which is of decided advantage, since the durability of the block 25 is thus prolonged. The structure of the blades is substantially the same as regards the means for attaching the sharpener attachment, and the same may thus be interchangeably disposed upon either of the blades when it is desired to sharpen the other. When the shears are in use, of course the sharpener attachment is not in position upon the blades.

The relatively fixed spring-plate 24 is provided at one end with an opening which receives the pivotal fastening 7 and at the other end is provided with a notch 32, similar to that provided upon the curved end portion 11ª of the plate 11, a lug being disposed within the notched portion, which is received by an opening 33 adjacent the outer end of the blade 2. The blades are preferably formed from sheet-metal blanks bent into the proper shape to form the blade and butt portions thereof, and the several parts of the device are arranged and constructed in such a manner that the same may be cheaply manufactured and at the same time possess advantages which have not heretofore been attained in this art.

Having thus described the invention, what is claimed as new is—

1. In shears, the combination with blades, of handles provided with tubular journals mounted upon the butt-ends of the blades, locking elements projected from the butt-ends for coöperation with the journals of the handles to secure the latter in an adjusted position, and spring means coöperating with the handles to normally hold the same in engagement with the locking means upon the butt-ends of the blades.

2. In shears, the combination with blades provided with tubular butt-ends, handles having tubular journals mounted for rotatory movement upon and receiving the butt-ends, locking means projected from the butt-ends and coöperating means upon the journals for engagement with the said locking means, and spring means disposed within the tubular butt-ends and adapted to coöperate with the journaled portions of the handles to hold the latter in engagement with the locking means upon the butt-ends of the blades.

3. In shears, reversible blades having tubular butt-ends, handles having tubular journals mounted upon the butt-ends for rotatory movement, lugs projected from the butt-ends, notches provided upon the journals of the handles, spring-retracted stems disposed within the tubular butt-ends and provided with stops at their outer end portions for engagement with the journals of the handles, said stops being adapted to exert a pressure against the journals so as to normally hold the notched portions thereof in engagement with the lugs upon the butt-ends of the blades.

4. In shears, the combination with blades, pivot means for the said blades, a spring-plate disposed upon one of the blades and provided with a longitudinal opening to coöperate with the said pivot, teeth disposed longitudinally upon one of the blades and adapted to coöperate with the aforesaid spring-plate to secure same in an adjusted position, and a finger element mounted upon the butt-end of the aforesaid blades and adapted to coöperate with the teeth aforesaid to actuate the said plate to an ascertained adjustment.

5. In shears, the combination with blades, pivot means for securing the blades together consisting of a headed fastening, spring-plates disposed upon opposite sides of the aforesaid blades extending longitudinally thereof and coöperating with the fastening, said plates equalizing the tension exerted from opposite directions upon the blades.

6. In shears, and in a combination with blades, pivot means for securing the blades together, independent spring-plates coöperating with the aforesaid pivot means and extending longitudinally of the blades exerting a pressure against the respective blades in opposite direction so as to equalize the tension upon opposite sides of the blades.

7. In shears, the combination with blades, a headed pivot-fastening adapted to secure the blades together, notches disposed upon opposite sides of one end of the fastening, a spring-plate having a longitudinal opening therein to receive the notched end of the fastening, teeth disposed upon the butt-end of one of the blades and adapted to coöperate with the end portion of the spring-plate to fix the same in an ascertained adjustment, a finger element mounted upon the butt-ends of the aforesaid blades and adapted to coöperate with the toothed portion thereof to actuate the spring-plate, said finger element being adapted for a rotatory movement from the butt-end of the blade.

8. In shears, the combination with blades, of a sharpener attachment adapted to be attached intermediate the blades.

9. In shears, the combination with blades, of a sharpener attachment adapted to be secured interchangeably to the said blades and by manipulation thereof to sharpen the cutting edges of the blades.

10. In shears, the combination with blades, of a sharpener attachment adapted to be secured upon the inner faces of either of the blades.

11. In shears, the combination with blades of approximately concavo-convex form, and a sharpener attachment to be interchangeably secured to the concave side of either of the blades for coöperation with the cutting edges upon the blade opposite to which it is secured.

12. In shears, the combination with blades of approximately concavo-convex form, of a sharpener attachment of approximately plano-convex form adapted to be interchangeably secured in the concave portions of the blades.

13. In shears, the combination with blades of approximately concavo-convex form, a sharpener attachment adapted to be interchangeably secured in the concave portions of the blades, said attachment comprising a filler-block having a renewable abrasive surface thereon.

14. In shears, the combination with blades of approximately concavo-convex form, of a sharpener-block of approximately plano-convex form adapted to be interchangeably secured within the concave portions of the blades, and abrasive material applied to the plane side of the said block.

15. In shears, the combination with blades of approximately concavo-convex form, a sharpener-block adapted to be secured within the concave portions and of approximately plano-convex form in cross-section, a plate rigidly disposed within the concave portions of the blades, a lug projected from the sharpener-block and adapted to engage beneath the aforesaid plate, and pawls disposed upon the sharpener-block and adapted to engage in recesses upon the blades, the said lugs and pawls constituting means for securing the sharpening attachment to the blades.

In testimony whereof I affix my signature in presence of two witnesses.

GEORGE B. ROWE. [L. S.]

Witnesses:
LUCY J. PAYNE,
J. M. ARCHER.